(12) United States Patent
Meiners et al.

(10) Patent No.: US 9,965,573 B2
(45) Date of Patent: May 8, 2018

(54) SYSTEM AND METHOD FOR DESIGN OF SUBSURFACE DRAINAGE SYSTEMS INCORPORATING CONTROL WEIRS, SURFACE TO SUBSURFACE INLETS, AND IRRIGATION INLETS

(71) Applicants: Chad R Meiners, Westford, MA (US); Jeremy R Meiners, Anchor, IL (US); Robert E Meiners, Anchor, IL (US)

(72) Inventors: Chad R Meiners, Westford, MA (US); Jeremy R Meiners, Anchor, IL (US); Robert E Meiners, Anchor, IL (US)

( * ) Notice: Subject to any disclaimer, the term of this patent is extended or adjusted under 35 U.S.C. 154(b) by 471 days.

(21) Appl. No.: 13/894,493

(22) Filed: May 15, 2013

(65) Prior Publication Data
US 2013/0311144 A1 Nov. 21, 2013

Related U.S. Application Data

(60) Provisional application No. 61/647,237, filed on May 15, 2012.

(51) Int. Cl.
*G06F 17/50* (2006.01)
(52) U.S. Cl.
CPC ...... *G06F 17/5004* (2013.01); *G06F 2217/34* (2013.01)
(58) Field of Classification Search
CPC ..... B60W 2550/142; B60W 2550/143; B60W 2550/402; B65G 5/005; E01C 13/02; G01C 15/00; G01C 15/004; G01S 13/876; G01S 13/885; E02B 13/00; G06F 17/5004; G06F 2217/34; G01B 9/02048; G01B 9/02077; G01B 9/02087; G01B 9/02091

USPC .................................................. 703/1, 9, 10
See application file for complete search history.

(56) References Cited

U.S. PATENT DOCUMENTS

| | | | | |
|---|---|---|---|---|
| 4,180,348 A | * | 12/1979 | Taylor | E02B 13/00 405/37 |
| 4,615,642 A | * | 10/1986 | Mason | A01G 25/06 239/145 |
| 5,995,895 A | | 11/1999 | Watt et al. | |
| 6,438,922 B1 | * | 8/2002 | DeLeFevre | E04G 9/10 52/741.1 |
| 2002/0162668 A1 | | 11/2002 | Carlson et al. | |

(Continued)

OTHER PUBLICATIONS

Becks_Hybrid_2010_Transcript.pdf (Beck's Hybrids PFR—Sub-Irrigation and Tiling Demo, dated Jul. 9, 2010 on YouTube).*

(Continued)

*Primary Examiner* — Brian S Cook
(74) *Attorney, Agent, or Firm* — 24IP Law Group; Timothy R DeWitt

(57) ABSTRACT

A method for the creation of subsurface water management systems that place subsurface drainage lines at a consistent grade and within defined elevation bounds throughout a field with topographical undulation and inconsistent slopes, incorporate control weirs for dividing the subsurface into elevation and acreage zones, place and size surface to subsurface, size and determine inside surface of drainage mains and laterals according to the desired coefficient of the subsurface system, and determine the amount of water required at irrigation inlets in order to deliver a determined amount of water into the subsurface system for purposes of irrigation.

14 Claims, 8 Drawing Sheets

(56) References Cited

U.S. PATENT DOCUMENTS

| | | | |
|---|---|---|---|
| 2004/0168358 A1 | 9/2004 | Stump | |
| 2008/0072968 A1* | 3/2008 | Peters | B65G 5/005 137/391 |
| 2008/0262988 A1* | 10/2008 | Williams | G06N 3/12 706/13 |
| 2010/0211512 A1* | 8/2010 | Detwiler | G06Q 10/04 705/315 |
| 2011/0071803 A1* | 3/2011 | Meiners | A01B 79/005 703/1 |

OTHER PUBLICATIONS

AGREM_Sub_Irrigation_2009.pdf (http://www.agrem.com/wetlandsubirrigation.htm dated Mar. 16, 2009.*
Contour Plowing/Farming Archived Wikipedia dated Apr. 8, 2011.*
Veterinarires Sans Frontieres, Subsurface Dams: A Simple, Safe and Affordable Technology for Pastoralists, 2006 pp. 1-56, Belgium, Avenue Paul Deschanellaan 36-38.*
ADS_2001, Improving your bottom line from the underground, up, Advanced Drainage Systems, Inc. 4640 Trueman Blvd., Hilliard, OH 43026, 2001.*
Sharma, R.K., Irrigation Engineering, Including Hydrology: For the Students of Civil Engineering and Practicing Engineers, S Chang & Co. Ltd. Dec. 1, 2007.*
Davidson, D., Spatially Intense Subirrigation, DTN/The Progressive Farmer, 2:52 PM CDT Jul. 24, 2007 http://www.dtnprogressivefarmer.com/dtnag/view/ag/printablePage.do?ID=BLOG_PRINTABLE_PAGE&bypassCache=true&pageLayout=v4&blogHan.*
Doran, T.C., AGREM Press Release 2, AGREM Mapping Software will create Sub-irrigation systems that will increase yields and manage nitrate runoffs, AGRINEWS Wednesday, Oct. 26, 2005.*
Russnogle, J., Underground Irrigation, Farm Industry News, Mar. 1 2008.*
ARTS Hydraulic Design Software, Jan. 8, 2012 https://web.archive.org/web/20110108184309/http://www.aquavarra.ie/arts/.*
Schmid, R., Review of Modeling Software for Piped Distribution Networks, 2nd Edition, Jun. 2002, Skat Foundation.*
ADS_Website dated May 25, 2010 http://web.archive.org/web/20100525055657/http://www.ads-pipe.com/en/resources/calc_.*
Sewer Design Guidelines (Part Two, Section 9. Vertical Alignment—Pipe Slope, 2008, https://www.wsscwater.com/files/live/sites/wssc/files/Design%20Manuals/S-9-2008_20207.pdf).*
Wright (Planning an Agribultural Subsurface Drainage System, College of Agricultural, Food, and Environmental Sciences, University of Minnesota, 2001).*
King (Observations on the Rate of Percolation of Water from a System of Tile Drains, Agricultural Science, vol. VIII. Nos. 6-9, Jun.-Sep. 1894.).*
Thompson, Synthesis of TxDOT Storm Drain Design: Current Methodologies and Need for Alternative to the Rational Method, Report 4553-1, Project No. 0-4553, Oct. 2003, Center for Multidisciplinary Research in Transportation Department of Civil Engineering Texas Tech University.*
Smedema, L.K., Modern Land Drainage: Planning, Design and Management of Agricultural Drainage Systems, Taylor & Francis Group plc, London UK, 2004.*
Beers_1976 (Bulletin 15: Computing Drain Spacings: A generalized method with special reference to sensitivity analysis and geohydrological investigations, International Institute for Land Reclamation and Improvement/ILRI, 1976).*
SD_1992 (STD & SPEC 3.28 Subsurface Drain, 1992).*
Panuska_2011 (The Art and Science of Agricultural Drainage: Basic Engineering Principles, UW Extension, Jan. 20, 2011).*
Wright_2001 (Planning an Agricultural Subsurface Drainage System, Agricultural Drainage Publication Series, University of Minnesota Extension Service, BU-07685-S, 2001).*
King_1894 (Observations on the Rate of Percolation of Water from a System of Tile Drains, Agricultural Science, vol. VIII. Nos. 6-9, Jun.-Sep. 1894.).*

* cited by examiner

SYSTEM AND METHOD FOR DESIGN OF SUBSURFACE DRAINAGE SYSTEMS INCORPORATING CONTROL WEIRS, SURFACE TO SUBSURFACE INLETS, AND IRRIGATION INLETS

CROSS-REFERENCE TO RELATED APPLICATIONS

The present application claims the benefit of the filing date of U.S. Provisional Patent Application Ser. No. 61/647,237 filed by the present inventors on May 15, 2012.

The aforementioned provisional patent application is hereby incorporated by reference in its entirety.

STATEMENT REGARDING FEDERALLY SPONSORED RESEARCH OR DEVELOPMENT

None.

BACKGROUND OF THE INVENTION

Field of the Invention

The present invention relates broadly to the field of agriculture, and more specifically to the use of topographic data in the field of agriculture Brief Description of the Related Art In the field of agriculture, irrigation systems water crop fields, and tile systems manage water drainage in crop fields. Often, irrigation and tile systems are "sub surface," or installed underground. Networks of pipe and/or tubing are installed underground for both systems, including main collector lines and a number of outlets. Outlets drain excess water into non-crop areas or drainage ditches which move the water away from crop fields. One or more junction boxes may be installed to check flows, sub mains, and drains. Irrigation and tiling systems are placed to provide the surrounding topography the best possible water supply and drainage. Additionally, outlets are placed where they are best protected from erosion, settlement, rodents, silting, shifting and damage by machinery and livestock. Discharge outlets further must be placed above the natural water level or bottom of a drainage ditch so that discharged water can drain freely.

Generally, this requires drainage to be staged at various grades, effectively using gravity to effect draining. However, where needed, pumps can be installed to facilitate drainage.

In order to properly position and install sub surface systems, contractors must assess the topography of the land. To do so, a topographical map of the area is prepared. A topographical map represents a three-dimensional land surface on a two-dimensional plane, for example, a map on a piece of paper. A topographical map uses lines and symbols to represent features in relation to the earth's surface. Terrain shape and elevation are depicted with contour lines.

To prepare a topographical map, a survey must be taken to determine horizontal and vertical measurements of various elevation points. These horizontal and vertical measurements can be gathered either by using a Global Positioning Systems (GPS) or surveying from a known benchmark. Specific elevation points are triangulated, and topographical maps are developed by hand from the triangulated data set.

Using the topographical map, an engineer and/or contractor, typically, uses the information to design a tile system. The topographical map further provides elevational information that is especially important to programming machine tools used to install the tile system.

Other current systems collect data points using survey grade, Real-Time Kinematic (RTK) Differential Global Positioning Systems (DGPS). In order to generate a topographical map from the RTK system data, the collected data must first be transferred to a CAD program. The latitude, longitude, and altitude coordinates must be converted into a datum set for compatibility with CAD. The profile is then developed in CAD. Automated installation machines are grade controlled using the topographic map, and use the latitude, longitude, and altitude data generated by the RTK system. To use the topography data generated by CAD, the x,y,z datum sets must be converted back to latitude, longitude, and altitude data points. This repeated conversion degrades the precision of the data point locations.

U.S. Pat. Nos. 8,155,935 and 7,315,800 disclosed a system and method of managing the design and installation of agricultural water management systems. Another aspect was the provision a comprehensive system and method of managing the design and installation of water management systems, which reduces the amount of interface equipment, and reduces cost. The system and method provided comprehensive design and installation management for water management systems. Maps and grade profiles were created from data collected by Global Positioning devices in the field. Latitude, longitude, and elevation were triangulated from GPS data to develop contour, grade, and profile maps, used to design irrigation and drainage systems in real time. Customer billing information and vendor pricing information were then produced from map and grade profile data. Interfacing and machine control for machines used to install irrigation and/or drainage systems were generated from contour, grade and profile data. Data was exported and imported in common file formats for efficient data exchange.

SUMMARY OF THE INVENTION

The system and method of the present invention provide a comprehensive method for the creation of subsurface water management systems that place subsurface drainage lines at a consistent grade and within defined elevation bounds throughout a field with topographical undulation and inconsistent slopes, incorporate control weirs for dividing the subsurface into elevation and acreage zones, place surface to subsurface inlets (e.g., French Drains, post risers, etc.) designed according to the desired drainage coefficient of the subsurface system, size and determine type of drainage mains and laterals according to the desired coefficient of the subsurface system, and determine the amount of water required at irrigation inlets in order to deliver a determined amount of water into the subsurface system for purposes of irrigation. The above improvements are all part of the design process of creating a subsurface drainage system. As such, all of the mentioned additions are to build upon the integrated process described in U.S. Pat. Nos. 8,155,935 and 7,315,800, both of which are incorporated herein in their entirety.

Prior to this invention, subsurface drainage laterals have been designed for fields with undulating topography in a fashion where drains vary in grade and depth according to the undulations of the topography of the field. This invention allows for a method of designing the placement of subsurface drainage laterals so as to have a set grade and consistent depth for all laterals within the field regardless of undulations in topography. Such a method is best referred to as contour drainage design, as the placement of the subsurface drainage laterals matches closely to the natural contours of a field. The advantages of such placement of subsurface drainage laterals are a consistent water table is maintained throughout the field and subsurface drainage laterals intercept subsurface water flows without the need of dirt moving or land leveling in order to alter the natural topography of the field. Such placement of subsurface drainage laterals on the contour is a marked improvement over traditional methods of placing subsurface drainage laterals known as pattern or system tile.

Prior to this invention, control weirs were placed according to hand calculation without reference to lateral depth or acres to be controlled. This invention allows for placement of control weirs based on the depth of subsurface tile laterals relative to the location of the control weir on a subsurface main or sub main so that elevation zones as measured from the ends of tile laterals can be calculated almost instantaneously. Similarly, control weirs can also be placed based on the acreages covered by tile laterals, sub mains, and mains so as to eliminate the difficulties from too large of an amount of water to be controlled by a particular control weir. The advantage of this method of placement allows for control weirs to divide a field into set elevation zones for the control of the field's water table and also to eliminate undesired movement of water from one zone to another. Gate placement in such a fashion is a marked improvement on a method of water management in agriculture known as controlled drainage.

Prior to this invention, surface to subsurface inlets used to quickly move surface water from field depressions to a subsurface tile system were designed in terms of size and location by hand calculation without an automated means of determining the location or size of surface to subsurface inlets or the size of mains required to manage the desired amount of water to be removed by the surface to subsurface inlet. The present invention allows for the automated placement of surface to subsurface inlets and a determination of the size required of the surface to subsurface inlet to drain the amount desired to be removed from the surface. In addition, this invention allows for the determination of the required size of the subsurface tile main with respect to the amount of water removed from the surface to subsurface inlet.

Prior to this invention, the size of subsurface tile laterals and tile mains were determined by hand calculation; no automated system existed to determine size by length, grade, and amount of connections to other tile laterals and mains. This invention allows for the sizing and determination of inside surface of subsurface tile laterals and tile mains based on the length of each line, the slope of the tile, and number of laterals, mains, and surface to subsurface inlets connecting into the lateral or main. The size is determined according to the desired drainage coefficient for the system.

Prior to this invention, irrigation inlets to a subsurface drainage system were determined by hand calculation; no automated system existed to determine location of inlets or the amount of water required to enter into the system through the inlet in order to provide the desired amount of water for the system. This invention allows for placement of irrigation inlets and regulates the amount of water required to enter through the inlet so as to be able to provide uniform filling of the subsurface system at the amount desired for irrigation. Size of pressure line required to move irrigation water and the pump for irrigating can then be calculated. In addition, this invention allows for the development of an irrigation schedule under varied climatic scenarios based on the determined rate of application.

In a preferred embodiment, the present invention is a method for generating a subsurface drainage system that maintains a set slope and consistent depth for tile laterals throughout a specified area. The method comprises the steps of gathering GPS data of the specified area, the GPS data comprising a longitude, latitude and altitude of a plurality of points along a perimeter of the specified area and an interior of the specified area; transferring the gathered GPS data to a management computer; storing the gathered GPS data in the management computer; generating in the management computer a contour map of the specified area using the gathered GPS data; and designing by the management computer a drainage system from the contour map and the GPS data, wherein the designing comprises placing with the management computer a tile main in the design from an outlet to a location of highest elevation in the specified area, wherein a path taken by the tile main follows an outside border of the specified area; determining with the management computer a required slope of the tile main so as to minimize the number of changes in slope in the tile main while maintaining the tile main within a bounded depth range from the ground level; inputting into the management computer with an input device a desired bounded distance from tile lateral to tile lateral, grade, and bounded depth range from ground level; placing in the design with the management computer a first tile lateral connecting to the tile main, wherein the first tile lateral is placed at a starting location, direction, and footage so as to maintain inputted entered desired bounded distance from tile lateral to tile lateral, slope, and bounded depth range from ground level and wherein a new direction and a footage of the new direction of the first tile lateral are determined by the management computer until a final defined footage of the first tile lateral is reached; and placing in the design with the management computer a second tile lateral connecting to the tile main, wherein the second tile lateral is placed at a starting location, direction, and footage, wherein the second lateral will vary in distance to the first lateral within the defined bounded distance from tile lateral to tile lateral as undulations in the topography of the field may be inconsistent between the paths of the first tile lateral and the second tile lateral.

The method may further comprise determining with the management computer locations of a first control weir and a second control weir. The locations of the first control weir and the second control weir may be determined by the management computer according to a specified distance from the first control weir to the second control weir and a specified number of acres to be controlled by the first control weir. The management computer may determine the specified distance from the first control weir to the second control weir based upon an inputted water table height and an inputted amount of water to be controlled a within the specified number of acres to be controlled by the first control weir. The method may further comprise generating with the management computer machine code for installing a designed drainage system.

The designing of the drainage system may further comprise determining with the management computer an acreage draining into a depression and a volume of water that will enter into the inlet under a theoretically optimal situation of saturation above an outlet with no obstructions under multiple sizes and types of surface to subsurface inlets; inputting into the management computer a desired drainage coefficient and type of surface to subsurface inlet; and sizing with the management computer the surface and subsurface inlet and a tile main according to a volume of water entering through the surface to subsurface inlet, the specified drainage coefficient, the slope of tile main, and additional laterals and mains attached to the main for which the surface to subsurface inlet is draining.

Further, the step of designing the drainage system may further comprise determining with the management computer required diameter sizes and inside surface of tile laterals and mains according to a specified calculation. The step of determining required diameter sizes and inside surface of tile laterals and mains may further comprise automatically assigning with the management computer sequence numbers to all tile laterals and mains; selecting a main by its sequence number using an input device; specifying a drainage coefficient for the selected main; determining with the management computer the selected main's length, slope, and number of laterals, mains, and surface to subsurface inlets connected to the selected main; and calculating with the management computer a required size of the selected main and inside surface to meet the specified drainage coefficient with the conditions of length, perforation, slope, and number of laterals, mains, and attachments to the main. The step of determining required diameter sizes and inside surface of tile laterals and mains may further comprise calculating with the management computer a required size and inside surface of laterals attached to the selected main based on the drainage coefficient entered in for the main.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

In another embodiment, the present invention is a method for generating a subsurface drainage and irrigation system design that maintains a set slope and consistent depth for tile laterals throughout a specified area. In the method, a management computer and a contour map of said specified area are used to place a tile main in said design, wherein said tile main extends from an outlet to a location of highest elevation in said specified area, wherein a path taken by said tile main follows an outside border of the specified area. The management computer determines a required slope of the tile main so as to minimize the number of changes in slope in said tile main while maintaining said tile main within a bounded depth range from the ground level. A desired bounded distance from tile lateral to tile lateral, grade, and bounded depth range from ground level is inputted into the management computer using an input device. The management computer places a first tile lateral connecting to said tile main, wherein said first tile lateral is placed at a starting location, direction, and footage so as to maintain inputted entered desired bounded distance from tile lateral to tile lateral, slope, and bounded depth range from ground level and wherein a new direction and a footage of the new direction of said first tile lateral are determined by said management computer until a final defined footage of said first tile lateral is reached. The management computer places in the design a second tile lateral connecting to said tile main, wherein said second tile lateral is placed at a starting location, direction, and footage, wherein said second lateral will vary in distance to said first lateral within said defined bounded distance from tile lateral to tile lateral as undulations in the topography of the field may be inconsistent between the paths of said first tile lateral and said second tile lateral. The management computer determines locations of a first control weir and a second control weir and places them in the design, wherein said locations of said first control weir and said second control weir are determined by said management computer according to a specified distance from said first control weir to said second control weir and a specified number of acres to be controlled by said first control weir and said management computer determines said specified distance from said first control weir to said second control weir based upon an inputted water table height and an inputted amount of water to be controlled a within said specified number of acres to be controlled by said first control weir. The management computer places an irrigation inlet in each control weir in the design. The management computer determines acreage sizes of each of a plurality of irrigation zones in said specific area. A rate and amount of water to be added to the system are input into the management computer, and the management computer calculates a volume of water to be supplied to each irrigation zone so as to apply water uniformly to the system at the rate and total amount desired. Using that information, the management computer uses a size of an irrigation pressure line for each irrigation inlet and the total gallons per minute required by an irrigation pump.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

Figure 2:
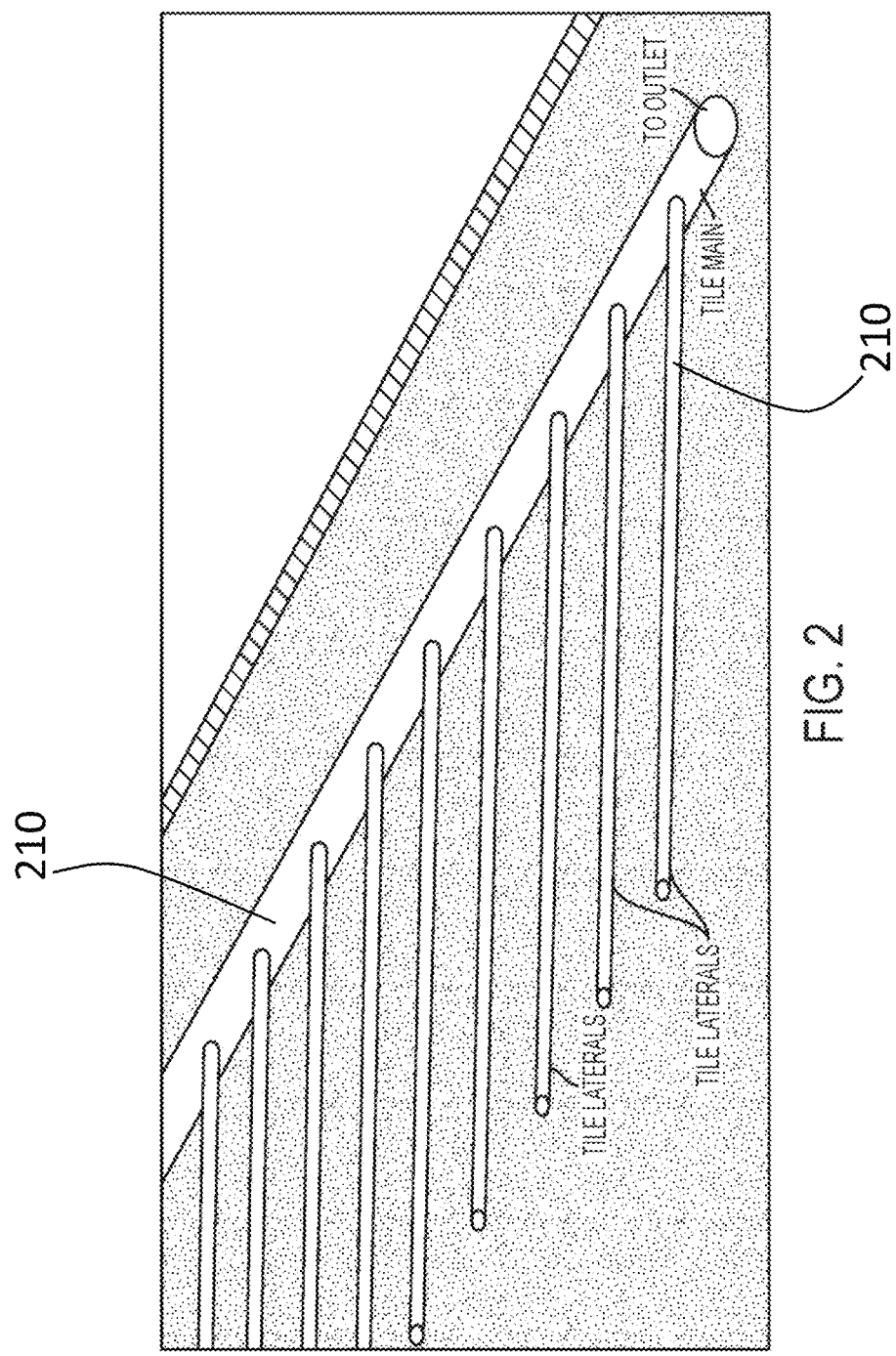
FIG. 2 is schematic of an exemplary subsurface tile system. This schematic shows a tile main, the path to an outlet, and tile laterals.
Figure 3:
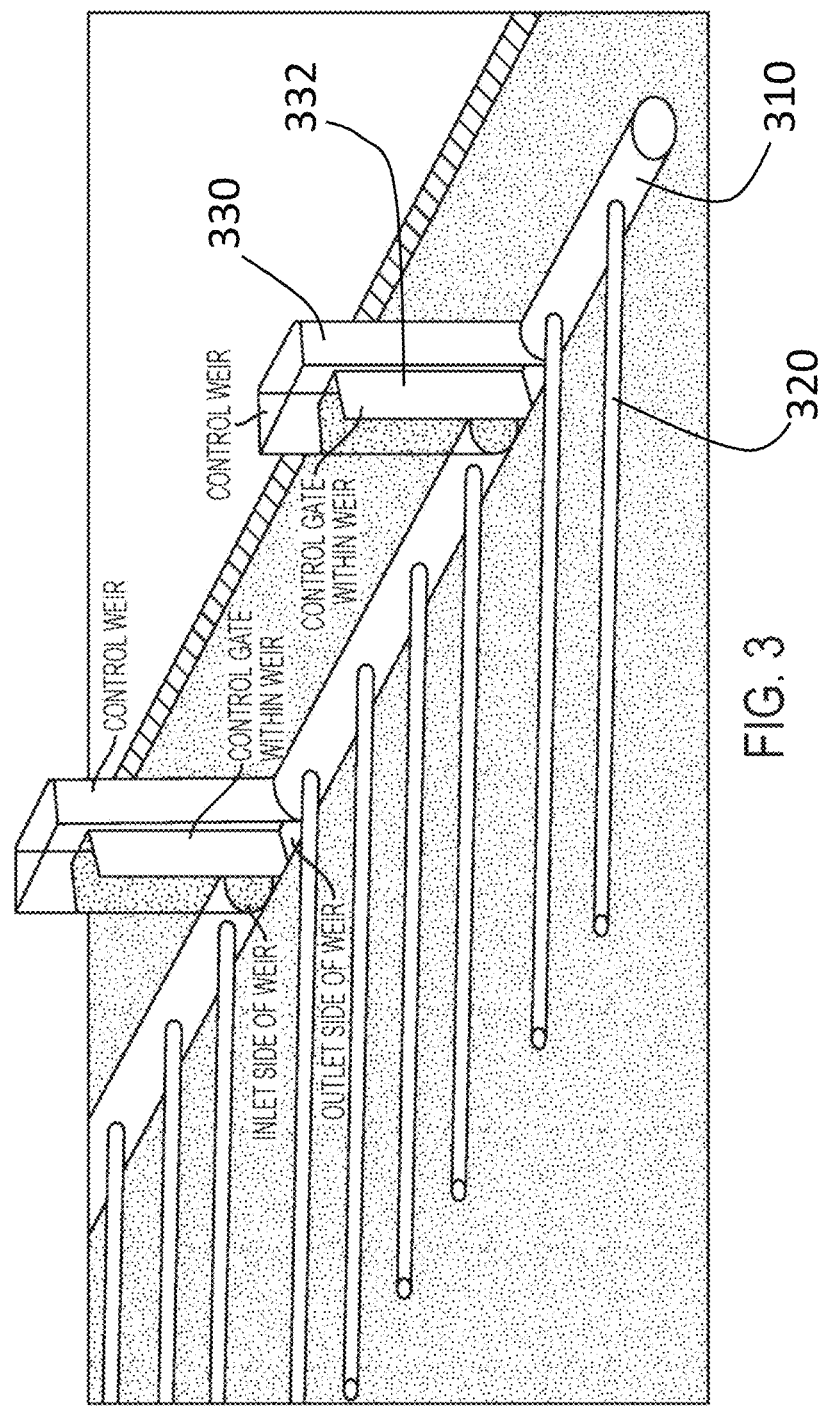
FIG. 3 is a schematic of an exemplary subsurface tile system incorporating control weirs. Note, the tile mains, path to an outlet, and tile laterals are represented in the same fashion as FIG. 2.
Figure 4:
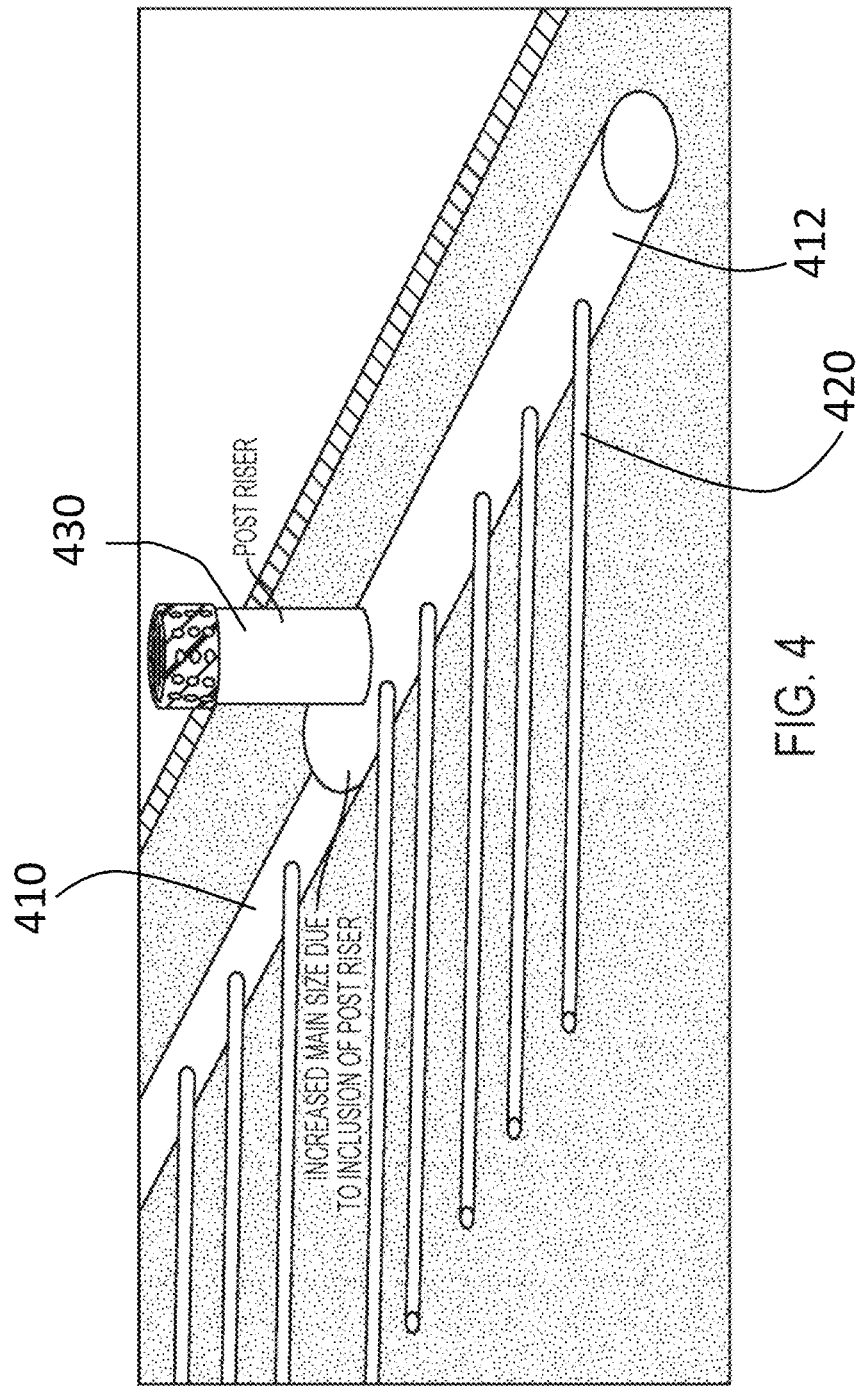
FIG. 4 is a schematic showing an example of a post riser and a main increased in size as a result of inclusion of the post riser. Note, the tile mains, path to an outlet, and tile laterals are represented in the same fashion as FIG. 2.
Figure 5:
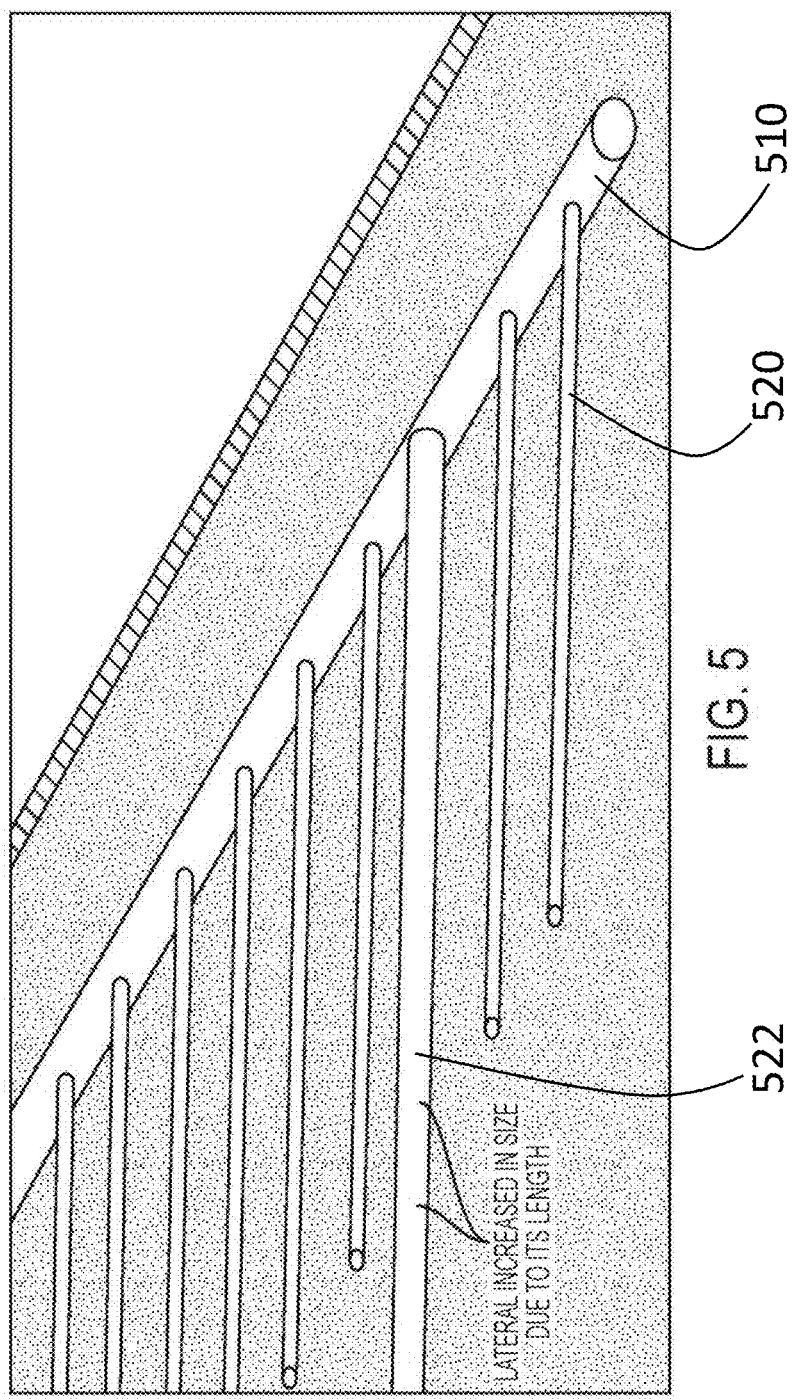
FIG. 5 is a schematic showing an exemplary tile lateral increased in size due to its length. Note, the tile mains, path to an outlet, and tile laterals are represented in the same fashion as FIG. 2.
Figure 6:
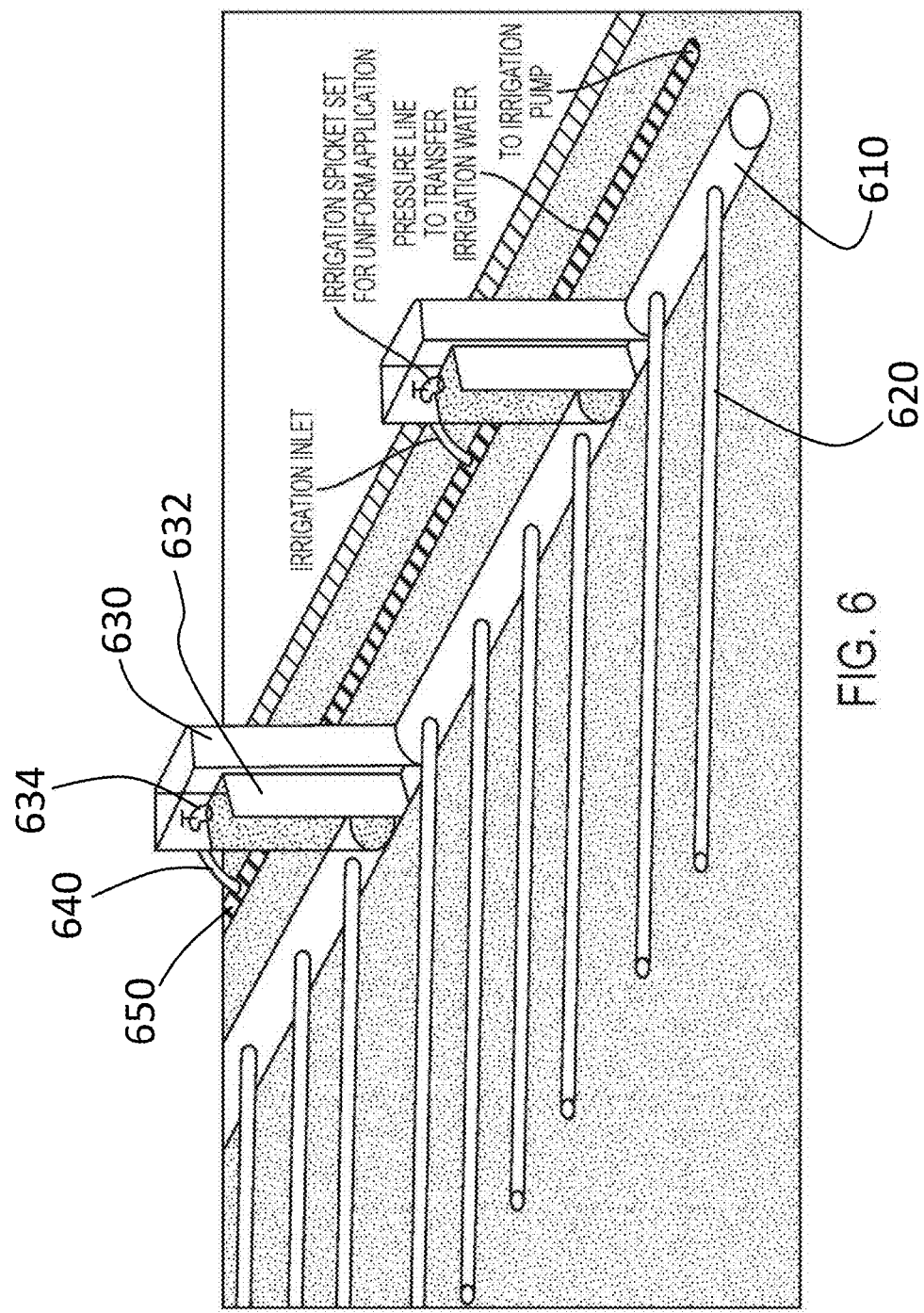
FIG. 6 is a schematic of an exemplary subirrigation system including irrigation inlets, set irrigation spickets for uniform application, pressure line for irrigation water transfer, and the route to the irrigation pump. Note, the tile mains, path to an outlet, tile laterals, and control weirs are represented in the same fashion as FIG. 3.

Preferred embodiments of the present invention will be described with reference to FIGS. 1-8. A subsurface system may be comprised of a variety of different components. As shown in FIG. 2, a simple system may have a tile main 210 and a plurality of tile laterals 220. A more complicated subsurface system, as shown in FIG. 3, may include a tile main 310, a plurality of tile laterals 320 and a plurality of control weirs 330 each having a control gate 332 within it. In another variation as shown in FIG. 4, a subsurface system may have a tile main 410, a plurality of tile laterals 420, and one or more post risers 430. The tile main 410 may have an enlarged section or portion 412 to accommodate the riser 430. Further, as shown in FIG. 5, a tile main 510 may have a plurality of tile laterals 520, one or more of which may be increased in size 522 due to their length. A yet more complicated subsurface system is shown in FIG. 6. A tile main 610 has a plurality of tile laterals 620 connected to and extending from it. The tile laterals 620 may be the same or different sizes depending on their lengths. The subsurface system may further include control weirs 630 having control gates 632 within them, pressure lines 650 connected to an irrigation pump to transfer irrigation water, irrigation inlets 640 and irrigation spicket sets 634.

Figure 1:
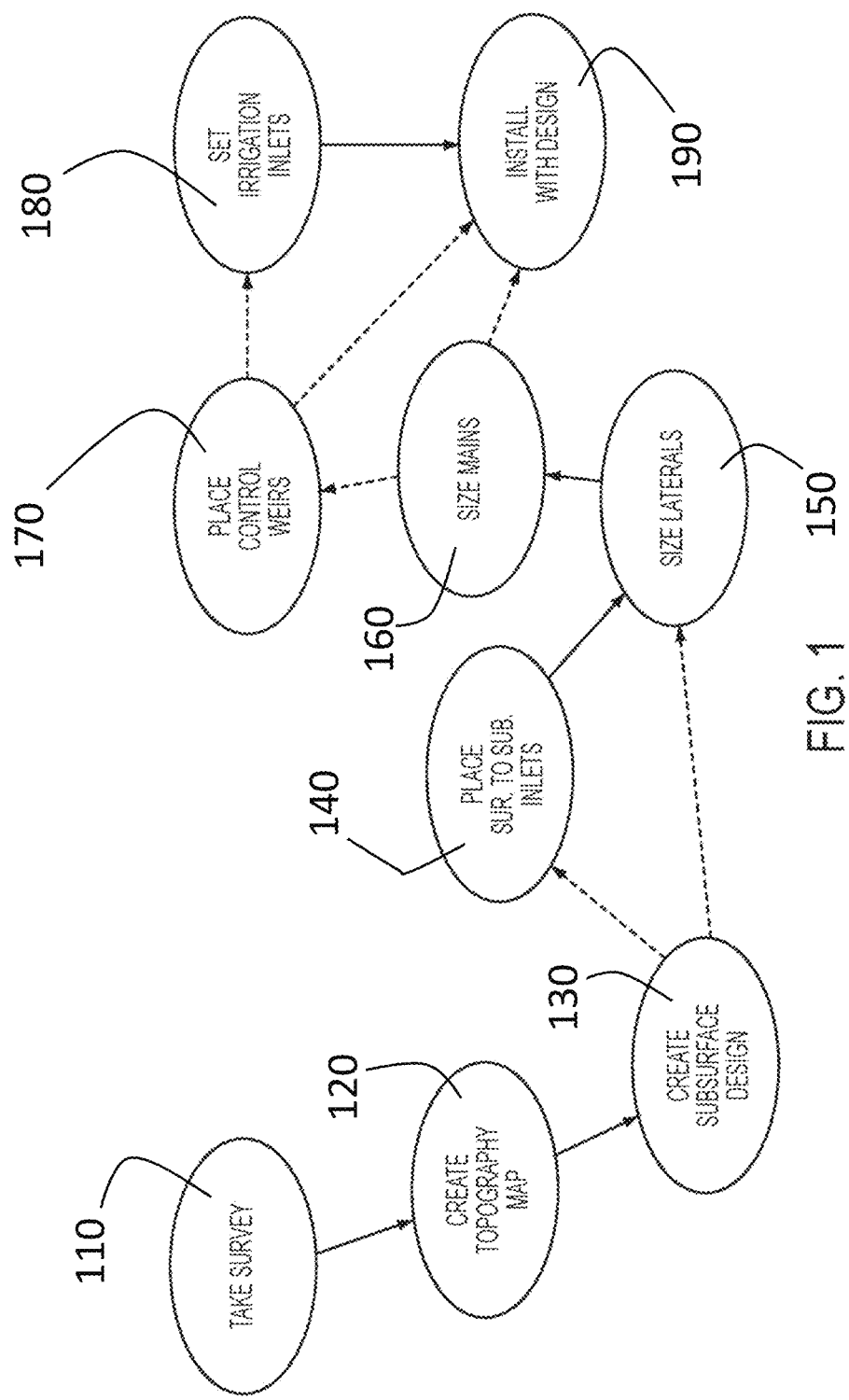
FIG. 1 is a flow diagram of a system and method for design from survey to installation in accordance with a preferred embodiment of the present invention. Multiple paths exist within the design process for the placement of surface to subsurface drains, sizing laterals, sizing mains, placing control weirs, and setting irrigation inlets.

As shown in FIG. 1, multiple paths exist within the design process for the placement of surface to subsurface drains, sizing laterals, sizing mains, placing control weirs, and setting irrigation inlets. A survey of an area to be irrigated is taken 110 such as with a global positioning system ("GPS"). The GPS is connected, for example, to a computer or processor, and the survey data from the GPS is transmitted to the computer or processor and is stored in memory or other storage. The survey data is then used to create a topography map of the area 120. A subsurface design is then generated by the processor or computer 130. At this point, the system and method may place surface to subsurface inlets 140 in the design and then size the laterals 150 or may proceed to directly sizing the laterals, depending on the particular system being designed. The placement of the surface to subsurface inlets and sizing of the laterals is performed via software stored in memory and running on the computer or processor. Next, the mains in the design are sized 160, again by software stored in memory and running on the processor or computer. Depending on the system being designed, control weirs may be placed in the design 170 and irrigation inlets may be set in the design 180. The system is then installed using the design 190.

Figure 7:
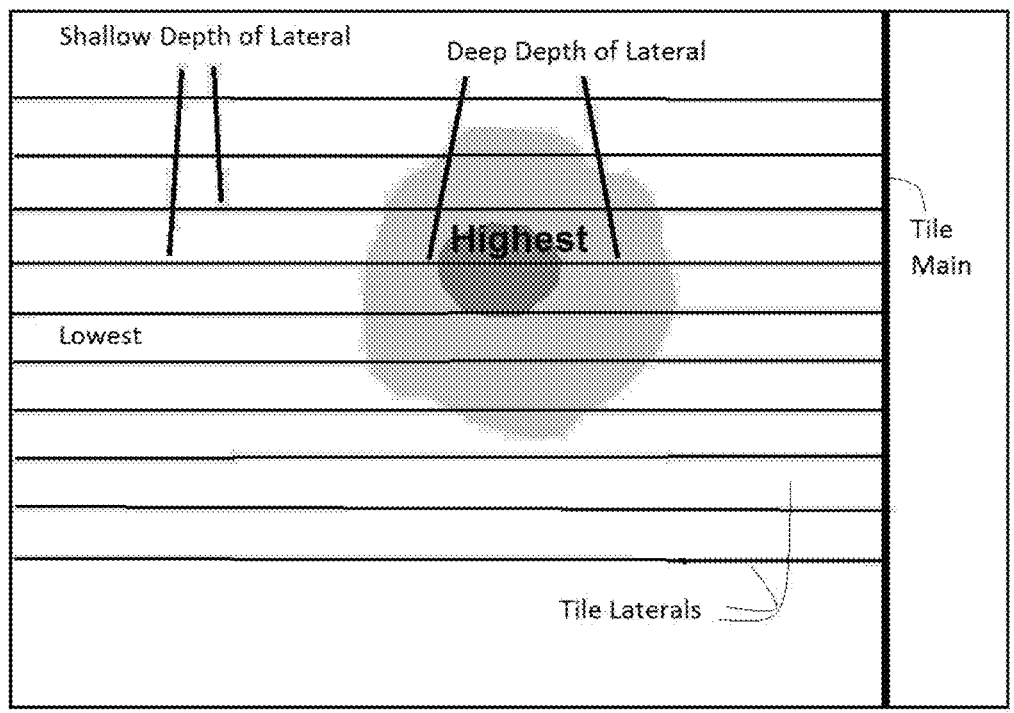
FIG. 7 illustrates a top down view of a simplified pattern or system tile subsurface drainage system design overlaid on a simplified topographical map.

An exemplary simplified pattern or system tile subsurface drainage system design overlaid on a simplified topographical map is shown in FIG. 7. The topography map shows a small hill in the center of the map with the darkest section representing the highest elevation, the medium darkened section the next highest level, and the lightest section the lowest portion of the field. A subsurface tile main is represented on the right hand of the map as a dark line running from the bottom of the map to the top. Subsurface tile laterals are represented as thin straight lines running to the left from the subsurface tile main. As subsurface tile laterals must always slope downwards to the subsurface tile main, the subsurface tile laterals shown as passing through the hill must necessarily have a greater depth when located below the hill than on either side, right or left, of the hill.

Figure 8:
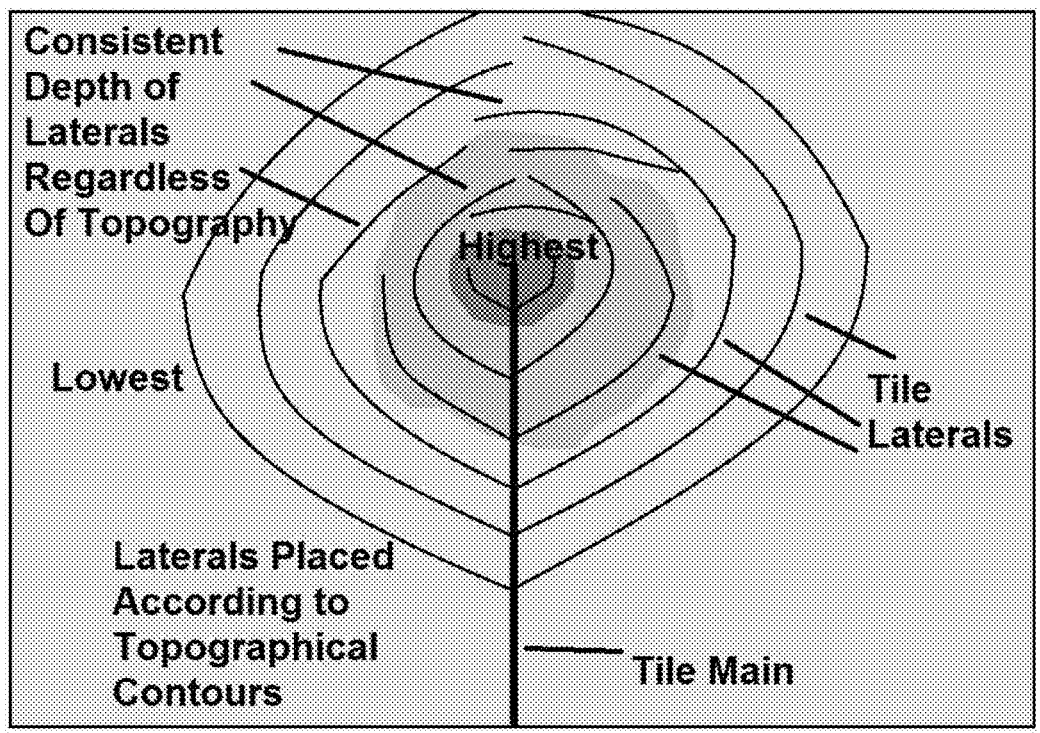
FIG. 8 is a top down view of a simplified contour subsurface drainage system design overlaid on a simplified topographical map.

A simplified contour subsurface drainage system design overlaid on a simplified topographical map is shown in FIG. 8. The topography map shows a small hill in the center of the map with the darkest section representing the highest elevation, the medium darkened section the next highest level, and the lightest section the lowest portion of the field. This hill is identical to the representative hill shown in FIG. 7. A subsurface tile main is represented in the center of the map as a dark line running from the bottom of the map to the top of the hill. Subsurface tile laterals are represented as thin curved lines running from the subsurface main around the hill so as to represent a subsurface tile drainage design matching the topography of the hill. As the subsurface tile laterals are placed in such a manner as they are located on areas of equal elevation, the subsurface tile laterals may have a set grade and consistent depth throughout their extent.

In a preferred embodiment, the present invention is a system and method having at least five improvements to the prior systems and methods. The improvements are:

Method of design of subsurface drainage laterals that places subsurface drainage laterals with a set grade and consistent depth throughout a field with an undulating topography and inconsistent ground level slopes Placement of control weirs according to elevation zones and acreage zones Placement of surface to subsurface inlets and sizing of the main so to accommodate the surface water in addition to subsurface water Sizing and determination of inside surface of subsurface laterals and mains according to the amount of water that will be draining into them based on their length, a specified drainage coefficient, grade, and number of laterals, mains, and surface to subsurface inlets attached to them Determination of amount of water required at each irrigation inlet so as to have a uniform application of water to the subsurface dual purpose drainage and irrigation system Description and Method of Point 1 (Method of Design of a Contour Drainage System):

Subsurface drainage tile systems are a series of slotted pipes, referred to as tiles in the industry, installed below the surface so as to lower the water table to the elevation level of the installed pipes. Subsurface drainage tile systems must be designed so as to have a method of emptying the pipes of collected waters. The location where tiles are emptied is known as an outlet. An outlet is often a ditch, creek, pond, larger pipe, or surface that is lower in elevation from the subsurface drainage tile system. Gravity is used within a subsurface drainage tile system to move water from the pipes to the outlet. A slope must be maintained throughout the subsurface drainage tile system such that water will flow to the outlet.

A subsurface drainage tile design is the layout of the tiles used for a subsurface drainage tile system with the origin of the system being the outlet. From the outlet, every tile can be described within the design by its starting location, direction installed, footage installed at the defined direction, and slope. As tiles need not be installed in straight lines and may vary in slope along its path, changes in direction and slope as denoted by footage distance from the starting location may be included as part of the subsurface drainage tile design. Tiles may also connect to one another at tees, wyes, or various other forms of connections. Within the industry of subsurface drainage tile design, the connection of one or more tiles is typically viewed as the beginning of a new tile and the end or continuation of the previous tile. At such connections then, at least one tile is defined with a starting location located at the connection, a direction installed, footage installed at the defined direction, and slope. A field or area is considered to have a completed subsurface drainage tile design if every tile to be located within the field is defined as above.

Within the subsurface drainage tile designs a tile that has multiple connections on it is often referred to as a main. Typically, a main is a larger size than the tiles that connect to it as it often will contain more water in it at any given point than tiles without tiles connected to it. As with other tiles, mains may or may not be connected to other mains. Tiles are connected to a main and have no connections or one connection to them are often referred to in the industry as laterals. Laterals tend to be smaller in size than mains as they will often contain less water in them at any given point due to the lack of connections to other tile.

Methods used for creating the topographical map and subsurface tile designs are described by U.S. Pat. Nos. 8,155,935 and 7,315,800. The predominant method of subsurface drainage tile design using the methods described by U.S. Pat. Nos. 8,155,935 and 7,315,800 and the methods used prior to the development of U.S. Pat. Nos. 8,155,935 and 7,315,800 are known as pattern or system tile. These designs have a single main or a combination of mains from the outlet to a defined location or locations within the field to be drained. Typically, the main is placed from the outlet to the highest area of the field along a route that requires the least amount of depth as measured from ground level to the bottom of the tile. In some instances, however, the main is installed along a different route so as to avoid a hazard, preexisting buried objects, or areas of high erosion. The slope of the main is then determined so as to minimize the number of times slope must be changed or so as to as closely as possible maintain an elevation given the topography of the path of the main. A main may require anywhere from zero to over ten thousand changes in slope. Often, the main will vary in depth from 2 feet below the surface to 8 feet below the surface.

From these mains, laterals are then connected to the main at a specified distance from one another (e.g., a lateral every 40 feet) and with a set angle of connection into the main (e.g., perpendicular to the main, 45 degree angle entering the main from the north, etc.). The direction of the lateral is then determined so as to maintain the specified distance determined at the connection. Laterals are installed in straight lines so as to maintain the specified distance from connections and reduce installation time. However, in some instances laterals vary from straight lines so as to avoid hazards, preexisting buried objects, and areas of high erosion. Sometimes a single lateral may also be placed parallel to natural land features, such as a grassed waterway, or the edge of the field. In some cases, these laterals are not straight lines but rather match the directional changes of the land feature. The slope of the lateral is then determined so as to minimize the number of times slope must be changed or so as to as closely as possible maintain an elevation given the topography of the path of the main. A lateral may require anywhere from zero to over ten thousand changes in slope. Often, laterals will vary in depth from 2 feet below the surface to 6 feet below the surface.

The described method of pattern or system tile design is common throughout the industry. The method has been used for over a century and has been very successful in fields with no undulations in topography and consistent ground level slopes. A field is considered to have an undulating topography if it contains at least one location where traveling in opposite directions results in increasing in elevation (e.g., a trough) or at least one location where traveling in opposite directions results in decreasing in elevation (e.g., an apex). A field is considered to have an inconsistent ground level slope if a line exists between any two locations in the field such that the absolute difference in the elevations of one location and the midpoint subtracted by the absolute difference of the second location and the midpoint is nonzero. Within fields with no undulations in topography and consistent ground level slopes, laterals can be designed using the methods described above with a consistent depth throughout the field and with a consistent slope equal to the ground slope of the field. Such systems provide a consistent water table in the field, which is ideal for root development of plants. However, very few fields occur naturally with no undulations in topography and consistent level slopes. As a result, earth moving and land leveling have been used to remove natural undulations and artificially create a consistent level slope. Preparing fields in such a fashion have been rare, however, due to the high cost of earth moving and land leveling.

Instead, pattern or system tile design has been most often applied to fields poorly suited for such designs due to undulating topography and a lack of consistent slope. Several problems are created by pattern or system tile design used for fields with topographical undulations and inconsistent ground level slopes. First, tile laterals are designed based on maintaining a set pattern, set distance from one another, and a set single direction. Topographical changes are then used to calculate slope and depth once the pattern is selected. As a result, grade and depth varies along each and between laterals depending on the undulations of the topography. This creates a non-uniform water table for the areas drained by the subsurface drainage system, reducing the effectiveness of the subsurface drainage system. Second, so as to maintain the defined pattern of the system, many tile laterals are designed so as to move parallel to the flow of subsurface water instead of perpendicular to the flow of subsurface water. Placing laterals in such a fashion reduces the ability of the subsurface drainage system to intercept subsurface water flows, reducing the efficiency of the subsurface drainage system. Third, inconsistent ground level slopes necessitate for some tile laterals changes in slope so as to avoid tile laterals being installed at a depth from ground level too deep for the methods used for installation. Changes in slope, particularly reductions, lower the rate of flow within a tile and reduce the amount of water that can be moved within the system. Changes in slope also create greater risk of error during installation (e.g., creating a reverse grade, known as a bauble, through a space of air generated between the tip of a tile plow and the boot where tile is placed from the surface into the cavity created by the plow).

The present invention provides a method for creating a variant of a pattern or system tile subsurface drainage system that maintains a set slope and consistent depth for tile laterals throughout the area covered by placing laterals at a desired bounded distance from tile lateral to tile lateral and along paths of natural topographical undulation and ground level slope. To create such designs, topographical data is generated, for example, but known methods, and transferred into a management computer as described according to U.S. Pat. Nos. 8,155,935 and 7,315,800. A contour map is then generated according to the methods used by U.S. Pat. Nos.

8,155,935 and 7,315,800. A design program is then initiated that places one or more mains from the outlet to the location of highest elevation. In placing the main, the path taken is one that follows the outside border of the area to be covered as far is possible considering the topography of the field and obstructions within the field such as hazards, preexisting buried objects, and areas of high soil erosion. The program then determines the required slope of the main so as to minimize the number of changes in slope while maintaining within a bounded depth range from the ground level. Upon completion of the design of the main, the program may place additional mains connecting to the outlet or already designed mains that reach areas of the field where the ground level slopes upwards in all directions, known as a wethole or pothole in the industry. The program may then further place additional mains connecting to the outlet or already designed mains that reach areas of the field where the ground level slopes downwards in all directions, known as a knob or hill in the industry. The program then determines the required slope of these mains so as to minimize the number of changes in slope while maintaining within a bounded depth range from the ground level.

Upon completion of the main design, a desired bounded distance from tile lateral to tile lateral, grade, and bounded depth range from ground level is entered into the program using an input device such as a keyboard, mouse or other means for entering data. The program will then initiate a routine that places a tile lateral connecting to a main. The lateral will be placed at a starting location, direction, and footage so as to maintain the entered desired bounded distance from tile lateral to tile lateral, slope, and bounded depth range from ground level. So as to maintain these requirements, the program will vary the direction and footage of the new direction until a final defined footage is reached. In so doing, a lateral is generated that may change directions from one to over ten thousand times in order to maintain its set grade and bounded depth range from ground level. Upon completion of the lateral, a second lateral is then created by the program located at a distance from the first lateral within the defined bounded distance from tile lateral to tile lateral. The lateral is created in a similar fashion to the first lateral except the second lateral will vary in distance to the first lateral within the defined bounded distance from tile lateral to tile lateral as undulations in the topography of the field may be inconsistent between the paths of the first and second lateral. The process of placing laterals is then continued until the whole field is covered.

Those familiar with the industry will recognize the novelty of such a method as in all previous methods of design direction and footage are defined and then slope and bounded depth range from ground level calculated. By defining slope and the bounded depth range from ground level and then calculating the necessary direction and footage of the direction a lateral is generated that maintains a set slope throughout a lateral and between laterals and that all laterals will be within the bounded depth range from the surface of the field. This method is known as contour drainage as the tiles appear to follow the contour lines of a topographical map of a field.

The benefits of the described method of contour design are numerous. First, the consistent bounded depth from elevation maintained by the design allows for a consistent water table to be maintained throughout the area covered by the design. Second, as laterals designed in this manner run perpendicular to the slope of ground level, each lateral functions as an interceptor to subsurface water movement. Third, as changes in slope do not occur for laterals, chances of error due to changing slope are eliminated for laterals.

Upon completion of design, a routine within the program can be initiated with an input device such as a mouse or keyboard that generates a machine code for installation as described by U.S. Pat. Nos. 8,155,935 and 7,315,800.

Description and Method of Point 2 (Placing Control Weirs):

Control weirs are vertical pipes or gates installed in a box on a main and have been used in subsurface drainage systems for over half a century. They are vertical barriers to the water flow within a main so that water must rise to the height of the vertical pipe or gate before it can continue to flow down the main. This occurs when the water table of the field above the control weir rises so as to equal or exceed the height of the vertical pipe or gate. The reason these are installed is simply to raise the water table of a field above the level of the subsurface tile drainage system. This slows down the movement of water off of the field, provides more water for the crops within the field, and reduces the amount of water soluble pollutants entering waterways. In the past, control weirs have typically been installed only at the end of subsurface drainage systems or randomly throughout a system.

Under the present invention, gates are placed on completion of a design of a subsurface drainage system as described in point 1 but prior to generation of a machine code for installation as described by U.S. Pat. Nos. 8,155,935 and 7,315,800. After having a complete design, a routine is initiated within the management computer software through an input device such as a mouse or keyboard that determines for each main the location of control weirs according to specifications entered into the routine. The two specifications used are vertical distance from the first control weir to the next control weir as measured from the end of tile laterals and number of acres served by a control weir. In doing so, the software will place control weirs at the exact latitude, longitude, and elevation along the main so as to maintain the specifications on height and acreage. The specifications are determined by the desired height of a water table and estimated amount of water to be controlled within the acreage served by a zone. The benefit of doing this is that by placing gates according to these specifications the water table can be more successfully raised and head pressure within the main reduced so as to reduce the likelihood of water flowing around the control weir through the soil profile so as to make the control weir ineffective. This is a far superior method of controlled drainage than the methods used prior to this invention. The information on control weirs can then be taken to the field so that the information on latitude, longitude, and elevation of the vertical pipe or gate is apparent to the contractor for installation.

Upon completion of control weir placement, a routine within the program can be initiated with an input device such as a mouse or keyboard that generates a machine code for installation as described by U.S. Pat. Nos. 8,155,935 and 7,315,800.

Description and Method of Point 3 (Surface to Subsurface Inlets):

Surface to subsurface inlets are openings from the surface to a subsurface drainage system that allow accumulated surface water to move with little restriction from the surface to the subsurface tile system. There are two main forms of such inlets in agriculture, a post riser and a French Drain. A post riser is a vertical pipe that goes from the surface directly into a tile main or lateral; it typically will have a brightly colored cover on it with large holes in it so as to be noticed by the farmer while working a field and also to block large objects from entering the tile system. Post risers function in the exact same manner as sewer drains in the city. French Drains are shallow large slotted subsurface drains with the soil above the drain removed and replaced with gravel. These operate much like post risers but do not require a hindrance in the field. Surface to subsurface inlets are most commonly placed in natural and manmade depressions in a field, known as wetholes or potholes. These types of inlets have existed for as long as subsurface tile drains have existed and have nearly always been placed through observing water pooling.

The water brought into the surface to subsurface inlet must then flow into a tile main and eventually into an outlet. The size of the surface to subsurface inlet and the size of the tile main determine how rapidly the water can be removed from the depression. The size of the surface to subsurface inlet is determined by the acreage of the depression. The process of determining the size of the tile main has been done exclusively by hand calculation based on the amount of water determined to be draining into the surface to subsurface inlet.

In the present invention, the location of the surface to subsurface inlet and size of the main attached to the surface to subsurface inlet is determined in the design process as described in point 1 above and can incorporate additional information into the sizing function of the main as described in point 3 below. With a completed design as described in point 1, a routine is initiated in the software using an input device such as a keyboard or mouse that identifies potential locations of surface to subsurface inlets. The routine then determines the acreage draining into the depression and determines volume of water that will enter into the inlet under a theoretically optimal situation of saturation above the outlet with no obstructions under multiple sizes and types of surface to subsurface inlets. The software, when the desired drainage coefficient is entered and type of surface to subsurface inlet, will then run a separate routine that will size the surface and subsurface inlet and the main according to the volume of water entering through the surface to subsurface inlet, the specified drainage coefficient, the slope of tile main, and additional laterals and mains attached to the main for which the surface to subsurface inlet is draining. The benefit of this method is that surface to subsurface inlets are placed at the optimum location in the field and the inlet and main are sized so as to remove the water to a provided specification. This reduces the probability of continued crop loss due to poor placement of a surface to subsurface inlet. It also ensures that a main is large enough to remove water at the desired rate but not too large as to have excess capacity and thus extra cost of material. All of the above can be done by hand calculation, but it requires a considerable amount of time and the novel process described within this invention reduces the time required significantly.

Upon completion of placing and sizing of surface to subsurface inlets, a routine within the program can be initiated with an input device such as a mouse or keyboard that generates a machine code for installation as described by U.S. Pat. Nos. 8,155,935 and 7,315,800.

Description and Method of Point 4 (Sizing of Subsurface Laterals and Mains):

Both laterals and mains collect water either through the soil or through other tile mains and laterals. Water collected within the lateral and main will move at a rate determined by the slope and inside surface of the lateral and main. The rate water enters a tile lateral and main will slow down once a threshold of water within the lateral or main is reached; this can be determined by the Manning's Equation. As such, for water to enter at the same rate the lateral or main must be increased in its diameter size. The rate at which water is removed from a subsurface drainage tile is known as the drainage coefficient, which is usually measured as number of acre inches of water removed in a day. The drainage coefficient of a tile lateral is determined by the length of the tile lateral, its inside surface, its slope, its diameter, and if it has any surface to subsurface inlets tied into it or any other tile laterals tied into it. The drainage coefficient of a tile main is determined by its length, its inside surface, its slope, its diameter, and the number of surface to subsurface inlets, tile laterals, and tile mains tied into it. Of note, other aspects of fluid dynamics (e.g., head pressure, turbulence, etc.) affect the rate and amount of water in a tile lateral and main as well and may be incorporated into the calculation.

In the past, tile lateral and main sizes have been determined by hand calculation or by reliance on local custom. The present invention on completion of a design as described in point 1 a routine within the software initiated by an input device such as a keyboard or mouse determines the required diameter sizes and inside surface of tile laterals and mains according to a specified calculation. To do so, names are automatically assigned by the software upon completion of the design to all tile laterals and mains. A main is then selected by its sequence number within the software using an input device such as a mouse or keyboard. Upon selection, a drainage coefficient for the main is specified and then a computer routine is operated that will identify the mains length, slope, and number of laterals, mains, and surface to subsurface inlets connected to it. The routine will then calculate the required size of the main and inside surface to meet the specified drainage coefficient with the conditions of length, perforation, slope, and number of laterals, mains, and attachments to the main. It will also calculate the required size and inside surface of laterals attached to the main based on the drainage coefficient entered in for the main. The routine will then modify the design so as to incorporate the changes of tile size and inside surface into the information provided for the bid sheet, map printing, and installation commands for the tile machine as described by U.S. Pat. Nos. 8,155,935 and 7,315,800. The process is then run for all of the mains included in the design.

The benefits of this process are that mains can be quickly sized to the desired drainage coefficient and inside surface without risk of over sizing mains and laterals or under sizing mains and laterals. Oversized mains and laterals have excess capacity that causes the price of material to be greater than is necessary. Undersized mains and laterals are incapable of moving the desired amount of water in a set period of time and thus cause a system to be inefficient. In the past, sizing of laterals and mains has been very time consuming, so much to the point that often sizing is not done.

Description and Method of Point 5 (Calibration of Irrigation Inlets):

When control weirs and irrigation inlets are incorporated in a subsurface drainage system, it is called a subirrigation system. Subirrigation systems, which have been used for over half a century, utilize a subsurface tile system for both drainage and irrigation. Generally, the control weirs are opened during rainy periods such as spring and fall and then closed for the summer, drier months. When closed, irrigation water is added through an inlet in order to fill the subsurface tile drainage system. The water will be kept within the system by the control weirs, and the water will flow out of the tile laterals through the perforations into the soil. The irrigation water will then raise the water table to that of the roots of field crops where it will then be absorbed by the field crops. The height required of the water table depends on soil type and type of crops planted. Height is adjusted according to placement of control weirs (see point 2).

In the past subirrigation systems have always been designed by hand, and often they have been designed on fields with naturally little to no slope or have been land leveled. Control weirs have been placed by hand calculation and, like controlled drainage systems discussed in point 2, the number of weirs has been few, often one per main. Irrigation water has been added at the top of the system and is added constantly until water flows over the control weir. That is, the water table becomes so high that it exceeds the level of the vertical pipe or gate of the control weir and the added irrigation water will flow out of the system into an outlet.

The present invention allows for the accurate measurement of the amount of irrigation water to be added for the whole system and at each irrigation inlet. Unlike past systems, the present method of application occurs by having irrigation inlets at every control weirs along a main, thus allowing each elevation and acreage zone to receive water at the same time as every other control weir. Of note, irrigation may occur all at once or in iteration; irrigation can happen in stages where some zones receive water on the first day, others the second, etc. Any combination of irrigation timing can be set up. With a completed design and with placement of control weirs as described in point 2, acreage sizes of each zone are determined by the activation of a computer routine within the software using an input device such as a mouse or keyboard. After specifying the rate and amount of water to be added to the system, a routine is run that calculates the volume of water to be supplied to each irrigation zone so as to apply water uniformly to the system at the rate and total amount desired. The routine will then provide the appropriate size of irrigation pressure line required for each irrigation inlet and the total gallons per minute required by the irrigation pump. This information is then made available in the design.

Upon completion, a routine within the program can be initiated with an input device such as a mouse or keyboard that generates a machine code for installation as described by U.S. Pat. Nos. 8,155,935 and 7,315,800. A separate routine is then activated within the software using an input device such as a mouse or keyboard that produces a printed map and computer that can be provided for installation of the irrigation pump and irrigation inlets.

The benefit of this improvement is that exact information on irrigation quantities to a subirrigation system are made apparent as well as the size of pressure line and pump required for irrigation. Irrigation made uniformly to a field through a subirrigation system allows for water to be applied in short bursts, facilitating deep root growth of field crops. In addition, water soluble nutrients can be applied with water in a uniform fashion. A substantial amount of time is also saved in determining sizes of irrigation inlets, irrigation pressure line, and pump size.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for installing a subsurface drainage system that maintains a set slope and consistent depth for tile laterals throughout a specified area with an automated grade controlled installation machine comprising:
   gathering GPS data of said specified area, said GPS data comprising a longitude, latitude and altitude of a plurality of points along a perimeter of said specified area and an interior of said specified area;
   transferring said gathered GPS data to a management computer;
   storing said gathered GPS data in said management computer;
   generating in said management computer a contour map showing a topography of said specified area using said gathered GPS data;
   generating from said contour map and said GPS data with said management computer a drainage system design for said specified area, said drainage system design having an outlet, a tile main, and a plurality of laterals, wherein said plurality of tile laterals have, a unique set of longitude and latitude coordinate locations per lateral, a set non-zero slope, and consistent depth throughout the specified area,
   wherein said generating with said management computer a drainage system design for said specified area comprises:
      generating with said management computer a unique series of longitude and latitude coordinate locations of said tile main in said design from said outlet to a location of highest elevation in said specified area, wherein a path taken by said tile main follows an outside border of the specified area;
      determining with said management computer a required slope of the tile main so as to minimize a number of changes in slope of said tile main while maintaining said tile main within a bounded depth range from a ground level;
      inputting into said management computer with an input device a desired bounded distance range from tile lateral to tile lateral, grade, and bounded depth range from ground level;
      generating in said design with said management computer a unique series of longitude and latitude coordinate locations of a first tile lateral position connecting to said tile main, wherein generating said first tile lateral position in said design comprises:
         generating in said design with said management computer, a starting series of longitude and latitude coordinate locations of said first tile lateral at a starting longitude and latitude coordinate location in a starting direction for a footage in said starting direction so as to maintain said desired bounded distance range from tile lateral to tile lateral, said set non-zero slope, and said bounded depth range from ground level; and
         generating in said design with said management computer additional series of longitude and latitude coordinate locations of said first tile lateral in directions different than said starting direction for differing footages so as to maintain said desired bounded distance range from tile lateral to tile lateral, said set non-zero slope, and said bounded depth range from ground level until a total defined footage of said first tile lateral is reached; and generating in said design with said management computer a unique series of longitude and latitude coordinate locations of a second tile lateral connecting to said tile main, wherein said second tile lateral is place at a unique latitude and longitude coordinate starting location, direction, and footage, wherein said second lateral will vary in distance and direction to said first lateral within said inputted desired bounded distance range from tile lateral to tile lateral so as to maintain said set non-zero slope and said bounded depth range as undulations in the topography of the specified area may be inconsistent between the paths of said first tile lateral and said second lateral;

after completion of said generating with said management computer a drainage system design for said specified area, initiating, with an input device commutatively attached to said management computer, a first routine to generate a machine code used during installation of said drainage system according to said generated drainage system design, and initiating with an input device commutatively attached to said management computer, a second routine to generate a printed map or computer display, used during installation of tile laterals according to the generated drainage system design, and providing the generated machine code to a machine control of an automated grade controlled installation machine used during installation of a drainage system according to the generated drainage system design, and controlling the operation of the automated grade controlled machine by executing the machine code in the automated grade controlled installation machine, and installing the tile main and the plurality of laterals at the unique series of longitude and latitude coordinate locations, the set non-zero slope, and the consistent depth throughout the specified area as illustrated on the printed map or computer display that are at the inputted grade and within the desired bounded distance range from tile lateral to tile lateral, and bounded depth range from ground level.

2. A method for installing a subsurface drainage system according to claim 1, wherein designing said drainage system further comprises:

determining with said management computer locations of a first control weir and a second control weir.

3. A method for installing a subsurface drainage system according to claim 2, wherein said locations of said first control weir and said second control weir are determined by said management computer according to a specified distance from said first control weir to said second control weir and a specified number of acres to be controlled by said first control weir.

4. A method for installing a subsurface drainage system according to claim 3, wherein said management computer determines said specified distance from said first control weir to said second control weir based upon an inputted water table height and an inputted amount of water to be controlled within said specified number of acres to be controlled by said first control weir.

5. A method for installing a subsurface drainage system according to claim 3, further comprising:

placing in said design with said management computer an irrigation inlet in each control weir.

6. A method for installing a subsurface drainage system according to claim 1, further comprising:

generating with said management computer machine code for installing a designed drainage system.

7. A method for installing a subsurface drainage system according to claim 1, wherein designing said drainage system further comprises:

determining with said management computer an acreage draining into a depression and a volume of water that will enter into the inlet under a theoretically optimal situation of saturation above an outlet with no obstructions under multiple sizes and types of surface to subsurface inlets;

inputting into said management computer a desired drainage coefficient and type of surface to subsurface inlet; and sizing with said management computer said surface and subsurface inlet and a tile main according to a volume of water entering through the surface to subsurface inlet, the specified drainage coefficient, the slope of tile main, and additional laterals and mains attached to the main for which the surface to subsurface inlet is draining.

8. A method for installing a subsurface drainage system according to claim 1, wherein designing said drainage system further comprises:

determining with said management computer required diameter sizes and inside surface of tile laterals and mains according to a specified calculation.

9. A method for installing a subsurface drainage system according to claim 8, wherein said determining required diameter sizes and inside surface of tile laterals and mains further comprises:

automatically assigning with said management computer sequence numbers to all tile laterals and mains;

selecting a main by its sequence number using an input device;

specifying a drainage coefficient for the selected main;

determining with said management computer said selected main's length, slope, and number of laterals, mains, and surface to subsurface inlets connected to said selected main; and calculating with said management computer a required size of said selected main and inside surface to meet said specified drainage coefficient with the conditions of length, perforation, slope, and number of laterals, mains, and attachments to the main.

10. A method for installing a subsurface drainage system according to claim 9, wherein said determining required diameter sizes and inside surface of tile laterals and mains further comprises:

calculating with said management computer a required size and inside surface of laterals attached to said selected main based on said drainage coefficient entered in for the main.

11. A method for installing a subsurface drainage system according to claim 10, further comprising:

modifying said design as to incorporate the changes of tile size and inside surface into information provided for a bid sheet, map printing, and installation commands for a tile machine.

12. A method for installing a subsurface drainage system according to claim 1, wherein said generating with said management computer a drainage system design for said specified area further comprises:

determining with said management computer locations of a first control weir and a second control weir, wherein said locations of said first control weir and said second control weir are determined by said management computer according to a specified distance from a first control weir to said second control weir and a specified number of acres to be controlled by said first control weir and said management computer determines said specified distance from said first control weir to said second control weir based upon an inputted water table height and an inputted amount of water to be controlled within said specified number of acres to be controlled by said first control weir;

placing in said design with said management computer an irrigation inlet in each control weir;

determining with said management computer acreage sizes of each of a plurality of irrigation zones in said specific area;

inputting with an input device a rate and amount of water to be added to the system;

calculating with said management computer a volume of water to be supplied to each irrigation zone so as to apply the water uniformly to the system at the rate and total amount desired; and determining with said management computer a size of an irrigation pressure line for each irrigation inlet and the total gallons per minute required by an irrigation pump;

wherein said first and second tile laterals have a set non-zero slope and consistent depth for tile throughout the specified area.

13. A method for installing a subsurface drainage system according to claim 1, further comprising:

determining with said management computer the set non-zero slope of the laterals so as to minimize the number of times slope of the main must be changed given the topography of the path of the main.

14. A method for installing a subsurface drainage system according to claim 1, further comprising:

determining with said management computer the set non-zero slope of the laterals so as to maintain an elevation of the main given the topography of the path of the main.

* * * * *